March 3, 1953  T. J. MESH  2,630,345
PRESSURE CONTROL FOR ELECTROMAGNETICALLY
OPERATED RECIPROCATING PISTON PUMPS
Filed May 18, 1951
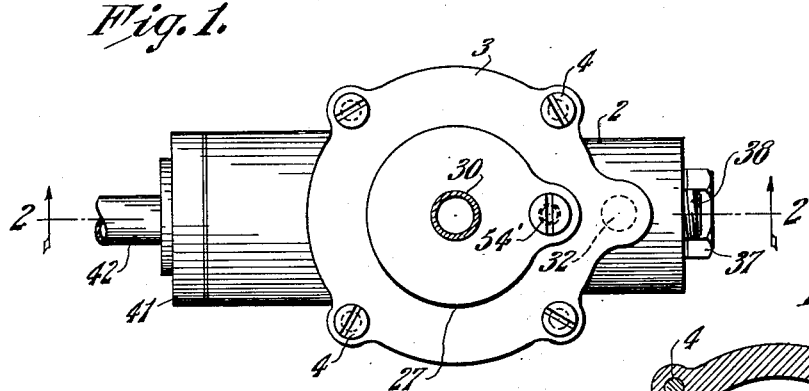
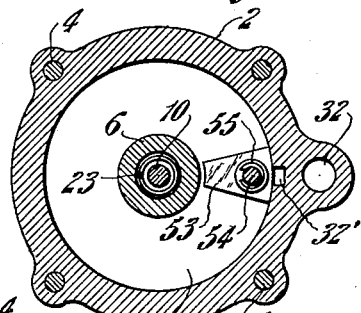
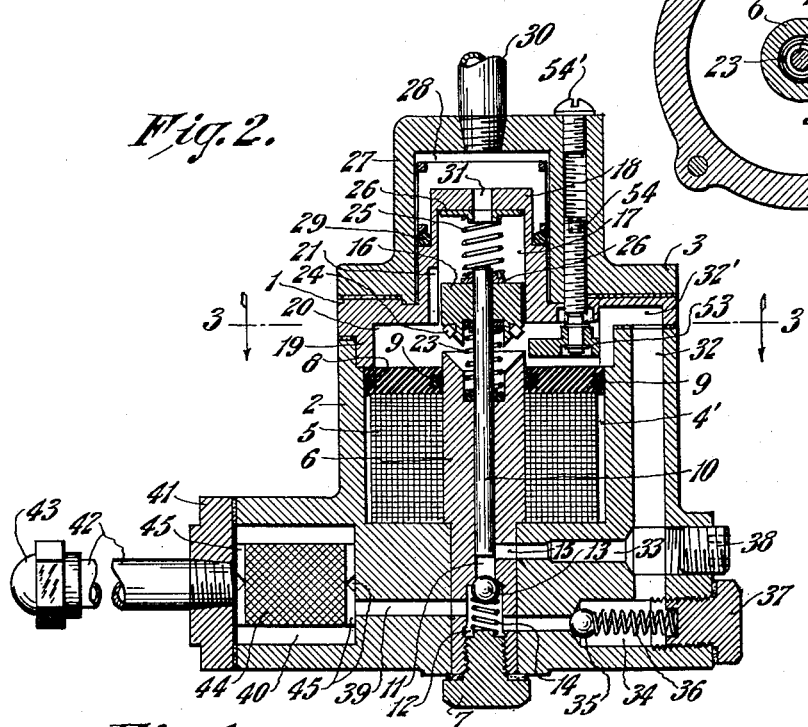
INVENTOR,
Theodore J. Mesh,
BY Chapin & Neal.
ATTORNEYS Patented Mar. 3, 1953

2,630,345

UNITED STATES PATENT OFFICE 2,630,345

PRESSURE CONTROL FOR ELECTROMAGNETICALLY OPERATED RECIPROCATING PISTON PUMPS

Theodore J. Mesh, Easthampton, Mass., assignor to Gilbert & Barker Manufacturing Company, West Springfield, Mass., a corporation of Massachusetts Application May 18, 1951, Serial No. 226,991

1 Claim. (Cl. 299—58)

This invention relates to improvements in pressure control for a reciprocating-piston pump, which is actuated electromagnetically from an alternating-current supply in pulses at the frequency of such supply and which forces liquid to a so-called mechanical or pressure atomizing nozzle for producing a spray of liquid or to other means that provide a substantially constant load.

A pump of this type is particularly desirable for use in connection with an automatic oil burner of the so-called gun type, having a mechanical atomizing nozzle for producing a finely divided spray of oil, because better atomization can be obtained. However, as pointed out in my prior application Serial No. 189,742, filed October 12, 1950, and owned by the assignee of the present application, this type of pump has the disadvantage that the pressure of the pumped oil varies widely with fluctuations in voltage of the alternating current supply and it is necessary to provide a pressure regulating means in order to maintain the pressure of the pumped oil substantially constant over a predetermined range of variations in line voltage. The said prior application provides a regulating means, which is effective to accomplish this result and which operates by maintaining the current in the magnet coil substantially constant over the selected range of voltage variations.

It is also necessary with oil burners of the type described to provide nozzles of different sizes to adapt the burner to the heating apparatus to be fired by the burner. A change in size of the nozzle will result in a change in the regulated pressure of the pump. For example, if the burner has a nozzle rated to deliver .75 gallon per hour and it is supplied by the pump with oil at 100 p. s. i., a change to a larger size nozzle say 1 gallon per hour would result in a drop in pressure to some lower value, say for example, 80 p. s. i The regulator will still maintain the pressure of the pumped oil substantially constant over the selected range of fluctuations in line voltage but the regulated constant pressure will have a lower value. It is desirable, for example, to be able to adjust the pressure so that each nozzle may be operated at its rated pressure or to be able to adjust the pressure to other values thought suitable. Also this must be done without adversely affecting the pressure-regulating means for, whatever the atomizing pressure selected, this pressure must be maintained substantially constant within a reasonable range of fluctuations in line voltage.

This invention has for its object the provision of an improved means for adjusting the pressure of the pumped oil to various values over a selected range without upsetting the action of the regulating means which maintains the pressure constant irrespective of variations in line voltage over a predetermined range.

More particularly, the invention has for an object the provision in an electromagnetically-actuated reciprocating-piston pump of the type described, of an adjustable magnetic member, which may be variably positioned in shunt relation with the piston-actuating armature of the pump in the magnetic circuit of the pump in order to divert various amounts of magnetic flux from the armature, whereby with the same current flow in the magnet coil and the same magnetic flux established thereby, variation of the pressure of the pumped liquid can be effected by diverting part of the flux from the armature through the parallel or shunt path.

The invention will be disclosed with reference to the illustrative example of it in the accompanying drawings, in which:

Fig. 1 is a top plan view of an electromagnetically controlled pump embodying the invention;

Fig. 2 is a sectional elevational view thereof taken on the line 2—2 of Fig. 1;

Fig. 3 is a sectional plan view taken on the line 3—3 of Fig. 2; and

Fig. 4 is an electrical diagram showing the operating circuit for the pump.

Referring to these drawings; the pump includes a housing (Fig. 2) made up of three sections, 1, 2 and 3 arranged end to end and suitably held together, with gaskets interposed between adjoining sections, as by the screws 4, shown in Fig. 2. The housing sections 1 and 2 are made of suitable magnetic material, as for example 15% steel cast iron. The section 2 has a cylindrical recess 4' to receive the magnet coil 5, one end face of which abuts the end wall of the recess. A core 6, which may be made of cold rolled steel, extends coaxially through the recess 4' and coil 5, and is suitably fixed in the end wall of such recess, as by the screw 7. An annular disk 8 of suitable insulating material engages the other end face of coil 5 and has inner and outer circumferential grooves, receiving inner and outer O-rings 9, which respectively press against the outer periphery of core 6 and the inner periphery of recess 4', thus closing the recess and sealing the coil 5 therein.

The core 6 has a coaxial opening to slidably receive a cylindrical rod 10, one end portion of which functions as a piston reciprocating in a cylinder 11. The latter opens into an outlet chamber 12, formed coaxially in member 6 and closed at its outer end by screw 7 and a suitable gasket. At the intersection of cylinder 11 and chamber 12 is a seat, which is engaged by a ball valve 13, held in place by a spring 14, having a seat on the inner end of screw 7. This spring allows valve 13 to open at some very low pressure, such as seven or eight p. s. i., for example. A radial inlet port 15 for cylinder 11 is provided in core 6.

The rod 10 extends beyond the upper end of core 6 and has fixed to its upper end an armature 16, which is slidable in a cylindrical recess 17 formed in the central hub portion 18 of the section 1. The latter magnetically connects with the annular shell portion of section 2 by means of the annular flange 19 and closes the open end of the shell, forming between it and the disk 8 a cylindrical chamber 20. The sections 1 and 2 and core 6 constitute a magnetic field member with spaced polar ends which, in this case, consist of the free end of core 6 and the wall of recess 17. This field member and armature 16 are connected in a magnetic circuit in which flux is created, when the coil 5 is energized, whereby the field member is magnetized to pull the armature toward one of its polar ends, namely, the free end of core 6. There are longitudinal grooves 21 in the peripheral wall of chamber 17 which provide constant communication between the latter and chamber 20. The confronting ends of armature 16 and core 6 are preferably of complementary frusto-conical shape as shown with central annular recesses which receive seats for an interposed spring 23, which encompasses rod 10. One of said confronting ends, in this case that of the armature, may have inserts 24 therein of suitable non-magnetic material, such as brass, to prevent such ends from sticking together if and when the pump operates at full stroke. Another spring 25, located between two annular seats 26, one on the upper end of armature 16 and one on the end wall of hub 18, acts on armature 16 in opposition to spring 23.

These springs 23 and 25 have the same dimensions and characteristics and are under the same initial stress. They tend to hold the armature so that the piston is midway in its stroke, as in the rest position illustrated. When coil 5 is energized, the armature 16 will be drawn toward the confronting polar face of core 6, the magnetic circuit extending axially through the core, across an axial air gap to armature 16, thence across a radial air gap to section 1, outwardly through the latter in many radiating paths to the annular shell of section 2, through such shell to the end wall of the section and thence inwardly through such end wall in many radiating paths to core 6. The coil 5 is adapted to be energized intermittently in pulses at the rate of 3600 per minute. When coil 5 is deenergized, in the intervals between successive electric pulses, the armature 16 will move away from the polar face of core 6 and above the midposition illustrated, thus actuating the piston on its suction stroke. On a succeeding energization of coil 5, the armature will be moved downwardly to move the piston on its pressure stroke and expel the liquid, drawn through inlet port 15 into cylinder 11, past valve 13 into outlet chamber 12. The mass of the armature 16 and rod 10 and the characteristics of springs 23 and 25 are so selected as to have a natural period of vibration substantially equal to the frequency of the electrical pulses. The resonant springs serve to keep the armature in vibration with only a small amount of assistance from coil 5, leaving the major part of the energy developed by coil 5 for the performance of useful work.

The housing section 3 is similar in form to section 1 and has a central hollow hub 27, which telescopes hub 18 and a flat annular part, which abuts the flat annular part of section 1. In the space between these hubs is a screen 28 or filter. The latter is cylindrical in form with its upper end closed and its lower end receiving an O-ring 29, which tightly fits the inner hub 18. Oil, or other liquid to be pumped, is drawn in from a suction pipe 30, enters through the end wall of hub 27, passes through screen 28 and thence through a hole 31 in the end wall of hub 18 and a spring seat 26 into chamber 17, from which it passes through grooves 21 into chamber 20. A longitudinal passage 32, formed in an outward protuberance on the shell portion of section 2, connects at its upper end by means of a passage 32' in member 1, with chamber 20 and at its lower end with the outer end of a radial passage 33, which is formed in section 2 and extends to and communicates at its inner end with the inlet port 15. The passage 32 also connects with the outer end of a radial by-pass passage 34 the inner end of which communicates with outlet chamber 12. Intermediate the ends of passage 34 is a seat for a ball valve 35 which is held closed by a spring 36, acting against a screw 37, that closes the outer end of passage 34. A similar screw 38 closes the outer end of passage 33. The valve 35 is a safety valve, opening only at abnormal and very high pressures, such for example, as 250 p. s. i., in the event of plugging the outlet of the nozzle, to be described, which is connected to receive the discharge of the pump. The outlet chamber 12 is connected by an outlet passage 39 to a chamber 40, both formed in section 2. Chamber 40 is closed by a cover 41, except for an outlet which is connected by a pipe 42 to an atomizing nozzle 43. In the cylindrical chamber 40 is a block 44 which is of square cross section and about the same length as the chamber. V-shaped grooves 45, intersecting at right angles, are provided in each end of block 44 to permit passage of liquid radially of the chamber from passage 39 and to pipe 42. Pressure tends to press block 40 away from that end wall of chamber 40, into which passage 39 opens, thereby enabling communication with the adjacent grooves 45 even though passage 39 does not open into the central part of chamber 40. The block 44 is made of suitable resilient material, such as particles of ground cork held together by a rubber-like binder. This block functions to smooth out the pulsations in the stream of pumped oil. It will be compressed at the higher instantaneous pressures and will expand at the lower instantaneous pressures whereby the peaks in the pressure wave will be removed and the valleys filled in so that there will not be wide fluctations in pressure in the oil stream fed to the atomizing nozzle. The pressures referred to herein are such as would be indicated on a pressure gauge.

This nozzle 43 is of the well known and so-called mechanical atomizing type, one example of which is fully disclosed in the application of Philip H. Bills, Joseph A. Logan and Theodore J. Mesh, Serial No. 124,638, filed October 31, 1949, now abandoned and owned by the assignee of the present invention.

With a pump of the type disclosed, it is necessary to provide a regulator, which will maintain the current in the magnet coil 5 substantially constant throughout a predetermined range of variations in the voltage. Without such a regulator, fluctuations in line voltage would produce fluctuations in current in the coil and this would result in fluctuations in pressure of the oil fed to nozzle 43. For this purpose, a regulator of the type disclosed in the first-named prior application may be employed. This regulator is shown diagrammatically in circuit with the magnet coil 5 in Fig. 4. A saturable reactor, comprising a coil 46 and a core 47, is connected in series with coil 5 and preferably also a half-wave rectifier 48 in a circuit, which is adapted for connection to a supply of alternating current, such for example as a 115 volt, 60 cycle, alternating current supply. The rectifier 48 preferably has a resistor 49 shunted across it to allow the flow of a small amount of demagnetizing current in the intervals between successive pulses which drive the piston 10 on its power strokes. Suitably coupled into the reactor winding 46 is a resistor 50 and a capacitor 51 arranged in series, with a winding 52 on core 47. The coupling in this case is like an auto transformer, the windings 46 and 52 together forming the secondary and the winding 46 alone forming the primary. The elements 46, 50, 51 and 52 are in a resonant circuit, in which the current surges back and forth and may rise to values several times the value of the current flowing in coil 5. Consequently, the core of the reactor can become magnetically saturated by the circulatory current in this resonant circuit before it could become saturated by the pump current flowing at normal line voltage in the circuit of coil 5. The core 47 of the reactor is so designed as to become substantially magnetically saturated by such circulatory current as flows in the resonant circuit, when resonance exists. This occurs, when the line voltage is at some selected predetermined value, which may be, and preferably is, normal line voltage, in this case 115 volts. At such voltage, the capacitative reactance and the inductive reactance within the resonant circuit have minimum values, which balance, and the effective impedance in such circuit is wholly resistive and at its minimum value. As the voltage decreases from normal, the reactance within the resonant circuit becomes capacitative and the effective impedance increases as line voltage decreases until a certain lower voltage limit is reached. As line voltage increases from normal, the reactance within the resonant circuit becomes inductive and increases as the voltage increases until a certain upper voltage limit is reached. Beyond the upper voltage limit, the inductive reactance within the resonant circuit does not materially change and beyond the lower voltage limit the effective capacitative impedance within such circuit does not materially change.

Having in mind that the coil is energized intermittently in pulses, the pressure of the pumped oil can be changed by varying the duration of each pulse to offset the change effected by voltage variation, which is to increase or decrease the amplitude of the pulse as the current rises or falls. For example, a decrease in line voltage from normal, which would otherwise result in a decrease in current and a decrease in the stroke of the pump with a resulting drop in oil pressure, can be offset to some extent by introducing capacitative reactance into the circuit of the coil 5. Such reactance has a tendency to prolong each pulse, making its duration somewhat more than the normal $\frac{1}{120}$ of a second in the case of 60 cycle power. Similarly, an increase in line voltage from normal, which would ordinarily result in an increase in current in the coil 5 and an increase in the stroke of the pump with a resulting increase in oil pressure, can be offset to some extent by introducing into the circuit of the coil 5 inductive reactance, which tends to shorten the pulses. Thus, at normal line voltage, the reactor and capacitor are in resonance and only the resistor, which is of constant value, is in the circuit of the coil 5. On an increase in line voltage from normal, inductive reactance is introduced to offset the effect of the voltage increase and progressively so as the voltage increases until the upper voltage limit is reached, when the inductive reactance is at its highest. On a decrease in line voltage from normal, capacitative reactance is introduced to counteract the effect of decreasing current by lengthening out the pulses and progressively so as the voltage decreases until the lower voltage limit is reached and the capacitative impedance reaches its maximum value. The resistor has the effect of providing a smooth transition from inductive reactance to capacitative reactance and vice versa and broadens out the range over which the resonant circuit is effective to change the pressure of the pumped oil.

The resonant circuit provides counter E. M. F. in the circuit to coil 5 and such counter E. M. F. is variable to some extent with line voltage variations so that the E. M. F. impressed on the coil 5 is modified to some extent by the variable voltage drop in the circuit of the reactor and this is to some extent a factor in accomplishing the result desired.

This invention provides a means for varying the pressure of the pumped oil in a manner which will not interfere with a regulator of the type just described or any other type which tends to maintain the current constant in coil 5 over a certain range of variations in line voltage. For this purpose, a magnetic shunt is provided, which is movable to various positions to divert more or less flux from that portion of the magnetic circuit which includes the armature 16. This shunt, as herein shown, consists of a sector-shaped piece 53 of magnetic material mounted on the inner end of a screw 54, threaded in the housing section 3 and readily movable by means of a screw driver from outside the housing, after a closure screw 54' has been removed. The screw 54 turns in the shunt member 53 and the latter is held against axial displacement between a shoulder on the screw and a snap washer 55 mounted on the screw. The outer end of shunt member 53 slidably engages the inner peripheral wall of the shell portion of housing section 2 and is thus held from turning on its screw 54 and also held in close magnetic proximity with the shell portion. The shunt member 53 extends inwardly with its inner end spaced from the axial center line of core 6 by a distance slightly greater than the radius of the core. By moving the member 53, the length of the air gap between its inner end and core 6 is varied, whereby to vary the reluctance of the shunt path. When the shunt member 53 is moved toward coil 5 as much as possible, the reluctance of this shunt path is at a minimum and the maximum amount of flux will be diverted from the armature 16 and, when the shunt member is moved away from coil 5 as far as possible, the reluctance of the shunt path is at a maximum and the minimum amount of flux will be diverted from the armature. Thus, the current in coil 5 may be maintained constant and the pressure of the pumped oil can be varied by varying the magnetic pull on armature 16 by diverting more or less magnetic flux from the latter through the shunt member 53.

The invention enables the pressure of the pumped liquid to be varied within reasonable limits as desired. Thus, the same atomizing pressure may be used with nozzles of various sizes or the pressure may be adjusted to other values that may be deemed suitable. The magnetic shunt operates to decrease the pressure of the pumped oil by taking away some of the magnetic flux that would otherwise act on the piston-actuating armature, thereby decreasing the pull on the armature and thus the pressure produced. Therefore, the pressure may be changed without varying the current that is maintained substantially constant in the magnet coil by the pressure regulator.

What is claimed is:

In an apparatus for atomizing liquid, of the type wherein liquid is forced by a reciprocating-piston pump through an atomizing nozzle having a gauged orifice of predetermined area and the piston of the pump is actuated on its pressure stroke by the armature of an electromagnet, having a coil, included in an electrical circuit, which is adapted for connection to a source of electromotive force, and operable when energized to create magnetic flux in the magnetic circuit which includes said armature, the combination of a regulator included in said electrical circuit for maintaining the current in said coil substantially constant over a predetermined range of variations in voltage of said supply, whereby to maintain the pressure of the liquid pumped to said nozzle constant irrespective of variations in voltage within said range and thus maintain the flow through the orifice of said nozzle constant at a selected rate, and means for changing said pressure for changing the flow rate to various selected values while the current through said coil is maintained constant by the regulator, said means comprising a magnetic member mounted in shunt relation with the armature in said magnetic circuit and manually movable to various positions to divert various amounts of magnetic flux from the armature whereby to vary the magnetic pull on the latter and thus the force for driving the piston on its pressure stroke.

THEODORE J. MESH.

REFERENCES CITED

The following references are of record in the file of this patent:

UNITED STATES PATENTS

| Number | Name | Date |
|---|---|---|
| 1,881,963 | Perrin | Oct. 11, 1932 |
| 1,906,027 | Wahl | Apr. 25, 1933 |
| 2,032,148 | Ramige | Feb. 25, 1936 |
| 2,318,359 | Bellows | May 4, 1943 |
| 2,410,692 | Strobell | Nov. 5, 1946 |
| 2,442,016 | Poole | May 25, 1948 |